United States Patent
Yang

(10) Patent No.: US 9,392,365 B1
(45) Date of Patent: Jul. 12, 2016

(54) PSYCHOACOUSTIC HEARING AND MASKING THRESHOLDS-BASED NOISE COMPENSATOR SYSTEM

(71) Applicant: Amazon Technologies, Inc., Reno, NV (US)

(72) Inventor: Jun Yang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 14/467,936

(22) Filed: Aug. 25, 2014

(51) Int. Cl.
*H04M 1/00* (2006.01)
*H04R 3/00* (2006.01)

(52) U.S. Cl.
CPC ............ *H04R 3/002* (2013.01); *H04R 2410/05* (2013.01)

(58) Field of Classification Search
CPC . H04M 7/125; H04M 7/006; H04M 2201/52; H04M 2201/40; H04M 2203/2027; H04M 2203/2066; H04M 3/002; H04M 3/2209; H04M 3/2272; H04M 7/0069; H04M 11/062; H04M 3/22; H04M 11/066; H04M 7/123; H04N 21/02
USPC ........................ 381/66, 77, 93, 92, 94.1–94.5, 381/71.1–71.6, 1, 300, 309; 379/406.01–406.8; 704/233, 221, 226, 704/204
See application file for complete search history.

(56) References Cited

U.S. PATENT DOCUMENTS

| | | | | |
|---|---|---|---|---|
| 5,920,834 A | * | 7/1999 | Sih | H04B 3/23 379/406.06 |
| 6,029,126 A | * | 2/2000 | Malvar | G10L 19/0212 704/204 |
| 2012/0237047 A1 | * | 9/2012 | Neal | H04M 9/082 381/66 |
| 2014/0126745 A1 | * | 5/2014 | Dickins | H04R 3/002 381/94.3 |
| 2015/0104031 A1 | * | 4/2015 | Park | G10K 11/1788 381/71.6 |

* cited by examiner

*Primary Examiner* — Lun-See Lao
(74) *Attorney, Agent, or Firm* — Knobbe Martens Olson & Bear, LLP

(57) ABSTRACT

Features are disclosed for performing noise compensation so a level of noise may be audible in an output signal. For example, a first noise level of a first signal can be estimated. The first signal can be processed (e.g., by residual echo suppression) to determine a second signal, and a second noise level of the second signal can be estimated. Residual echo suppression can sometimes cause background noise to be eliminated, causing silence. If the second noise level is less than a product of the first noise level and a noise threshold, then a noise signal based on the first noise level can be determined, wherein the noise level of the noise signal is configured to be above a hearing threshold. The noise signal can be combined with the second signal to generate an output signal.

22 Claims, 6 Drawing Sheets

PSYCHOACOUSTIC HEARING AND MASKING THRESHOLDS-BASED NOISE COMPENSATOR SYSTEM

BACKGROUND

Many communication devices configured to obtain audio data of user utterances include both a loudspeaker and a microphone. The loudspeaker is used to play audio signals, such as speech from a remote source during a telephone call, audio content presented from local storage or streamed from a network, etc. The microphone is used to capture audio signals from a local source, such as a user speaking voice commands or other utterances. An acoustic echo occurs when the remote signal emitted by the loudspeaker is captured by the microphone, after undergoing reflections in the local environment.

An acoustic echo canceller ("AEC") may be used to remove acoustic echo from an audio signal captured by a microphone in order to facilitate improved communication. For example, the AEC may filter the microphone signal by determining an estimate of the acoustic echo (e.g., the remote audio signal emitted from the loudspeaker and reflected in the local environment). The AEC can then subtract the estimate from the microphone signal to produce an approximation of the true local signal (e.g., the user's utterance). The estimate can be obtained by applying a transformation to a reference signal that corresponds to the remote signal emitted from the loudspeaker. In addition, the transformation can be implemented using an adaptive algorithm. For example, adaptive transformation relies on a feedback loop, which continuously adjusts a set of coefficients that are used to calculate the estimated echo from the far-end signal. Different environments produce different acoustic echoes from the same loudspeaker signal, and any change in the local environment may change the way that echoes are produced. By using a feedback loop to continuously adjust the coefficients, an AEC can adapt its echo estimates to the local environment in which it operates.

In addition, communication devices may also use a residual echo suppressor ("RES"). Various factors, including nonlinearity and background noise, can cause an echo to not be completely eliminated by an acoustic echo canceller. A residual echo suppressor may be used to further reduce the level of echo that remains after processing by an acoustic echo canceller. For example, residual echo suppressors may use non-linear processing to further reduce the echo level. In addition to echo, however, processing by a residual echo suppressor often eliminates noise as well. For example, a residual echo suppressor can receive an audio signal processed by an AEC and further process the signal so that the level of noise is wiped out completely.

Such processing by the residual echo suppressor can have the undesirable effect of creating silence in the audio output signal. For example, when a remote user is speaking an utterance, the residual echo suppressor can eliminate any residual echo as well as the background noise that was present. However, when a remote user stops speaking an utterance, the level of background noise may remain present in the output signal. The abrupt transition in an audio output signal that includes some level of background noise and one that does not (e.g., silence) can cause a remote listener to mistakenly believe that the communication link is dead. In addition, the frequent changes between listening to a signal that includes some level of background noise and one that does not can cause distraction to a remote listener.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

Introduction

Figure 1:
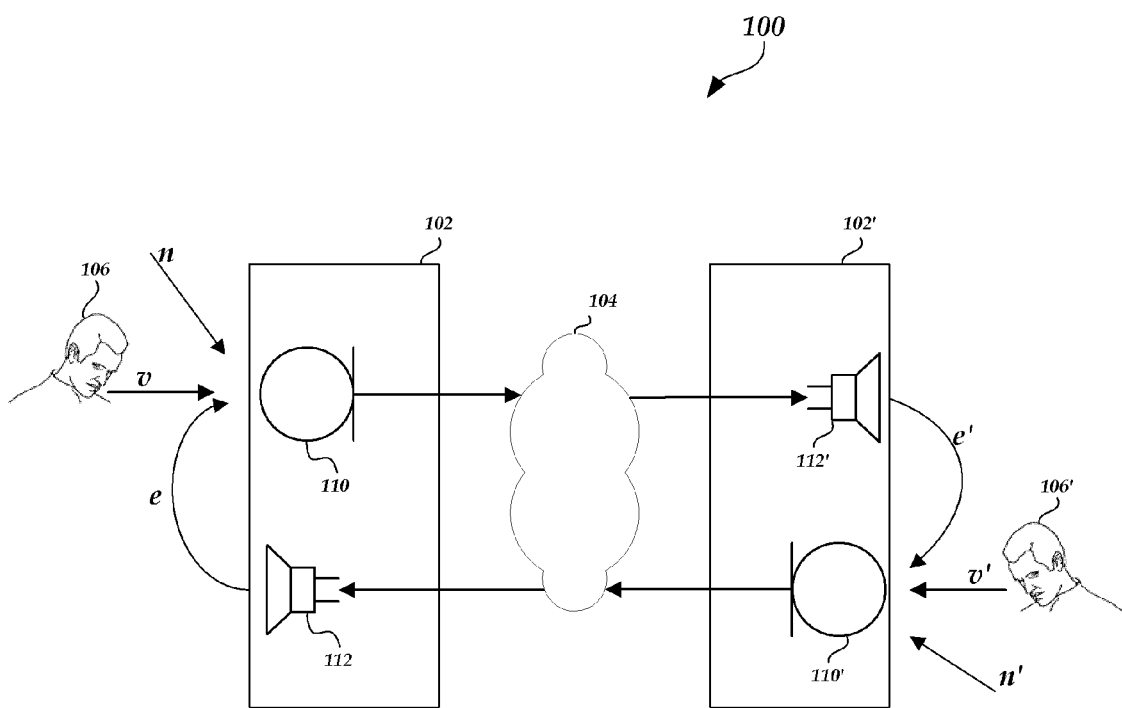
FIG. 1 is a block diagram of illustrative data flows and operations of a communication environment.

Communication devices, such as telephones and computing devices that present audio output and accept spoken input, may receive an acoustic echo of audio output as well as background noise in combination with spoken input. To a consumer of the spoken input, such as another party to a telephone call or an automatic speech recognition system, the noise and acoustic echo can interfere with spoken input and make it difficult to understand. Devices often include acoustic echo cancellers ("AECs") that attempt to remove acoustic echo from audio input, leaving only the spoken input (and environmental noise). Communication devices may also use a residual echo suppressor ("RES") to further reduce the level of echo that remains after processing by an acoustic echo canceller. In addition to echo, however, the processing by a residual echo suppressor often eliminates noise as well. This processing by the residual echo suppressor can have the undesirable effect of creating abrupt changes to silence in the audio output signal, which can cause a listener to mistakenly believe that the communication link is dead.

Aspects of the present disclosure relate to introducing comfort noise back into an audio signal processed by a residual echo suppressor. However, comfort noise may only need to be injected when it is necessary to do so for some level of background noise to remain audible to a remote listener. The injected comfort noise can match the spectral characteristics of the original background noise as it existed before reduction by the residual echo suppressor. By adding the comfort noise to the output of the residual echo suppressor, a remote listener can perceive a level of background noise whether or not a remote user is speaking an utterance. By maintaining a level of background noise, a remote listener will be informed that the communication link remains active.

In some aspects of the present disclosure, a communication device includes a microphone configured to detect sound as an audio input signal. One or more processors may be in communication with the microphone. The one or more processors may be configured to receive a first signal based on the audio input signal. For example, the first signal may comprise an echo-reduced signal output from an acoustic echo canceller. The one or more processors may be configured to estimate a first noise level of the first signal. The one or more processors may be configured to process the first signal to determine a second signal. For example, the one or more processors may be configured to perform residual echo suppression on the first signal to determine the second signal. The one or more processors also may be configured to estimate a second noise level of the second signal. In addition, the one or more processors may be configured to determine whether the second noise level is less than a product of the first noise level and a noise threshold. For example, by determining whether the second noise level is less than a product of the first noise level and a noise threshold, the one or more processors may determine whether the second noise level would be audible to a listener. In some embodiments, the noise threshold is adjustable by a listener, allowing listeners with different hearing sensitivities to adjust a noise floor below which the communication device injects comfort noise.

If it is determined that the second noise level is less than the product of the first noise level and the noise threshold, the one or more processors may be configured add a comfort noise signal to the second signal output from the residual echo suppressor. In some embodiments, the one or more processors may be configured to determine a noise signal based on the first noise level, wherein a noise level of the noise signal is configured to be above a hearing threshold. The noise signal may be configured to match spectral characteristics of the first noise level. The one or more processors may be configured to combine the noise signal with the second signal to generate an output signal. Accordingly, because the output signal is based on a combination of the noise signal and the second signal, the output signal may include audible noise so that a remote listener will be informed that the communication link remains active.

In some embodiments, the one or more processors may be configured to estimate an echo level of the second signal. If the one or more processors determine that the noise level of the noise signal is less than the echo level, the one or more processors can be configured to increase the noise level of the noise signal to be above the echo level. For example, the increased noise level of the noise signal can be used to mask a residual echo such that the residual echo is not audible to a listener.

In some embodiments, the first noise level comprises a noise level at a plurality of frequency bins. In addition, the hearing threshold may comprise a value for each of the plurality of frequency bins. The one or more processors may be configured to determine the level of the noise signal at each of the plurality of frequency bins, wherein the level of the noise signal at each of the plurality of frequency bins is above the value of the hearing threshold at each frequency bin. For example, the one or more processors can shape the noise signal to match spectral characteristics of the first noise level while being audible to a remote listener.

In some embodiments, the one or more processors are further configured to receive a masking threshold. The masking threshold may comprise a value configured so that a tone is audible at a first frequency even when a tone is present at a second frequency close to the first frequency. The masking threshold may take into account that the threshold to individually hear two closely spaced tones is greater than the threshold if either tone is present individually. The one or more processors may be configured to determine whether the noise level of the noise signal is less than the masking threshold, and, if it is determined that the noise level of the noise signal is less than the masking threshold, increase the noise level of the noise signal to be above the masking threshold.

Although aspects of the embodiments described in the disclosure will focus, for the purpose of illustration, with respect to a local device using comfort noise generation, one skilled in the art will appreciate that the techniques disclosed herein may be applied to any number of processes or applications performing comfort noise generation. Various aspects of the disclosure will now be described with regard to certain examples and embodiments, which are intended to illustrate but not limit the disclosure.

Communication System Environment

With reference to an illustrative embodiment, FIG. 1 shows example interactions and data flows in a communication environment 100 between communication devices 102 and 102', communication link 104, and users 106 and 106'. In particular, a communication device 102 generally can comprise a microphone 110 and a speaker 112. Similarly, communication device 102' comprises a microphone 110' and a speaker 112'. Both communication devices 102 and 102' can communicate with communication link 104.

The microphone 110 of communication device 102 generally detects sound from at least three sources when generating an audio input signal. For example, when user 106 speaks an utterance, the user's voice v is detected by the microphone 110. In addition, background noise n present in the user's environment is detected by the microphone 110. In addition, speaker 112 produces sound, creating an acoustic echo e that is detected by the microphone 110. Thus, an audio input signal detected by the microphone 110 includes components attributable to the user's voice v, the background noise n, and the acoustic echo e.

After processing the audio input signal, the communication device 102 generally sends an output signal through the communication link 104 to the receiving communication device 102'. The communication link 104 may be a telephone network, a data network, or a combination of the two. In addition, the communication link 104 may be a wired network, a wireless network, or a combination of the two. For example, the communication network may be a landline telephone network, a cellular network, or combinations of the same. The communication link 104 may be a personal area network, a local area network (LAN), a wide area network (WAN), the Internet, or combinations of the same. Protocols and components for communicating via any of the other aforementioned types of communication networks, including TCP/IP protocols, can be used in the communication link 104.

Upon receipt of the audio output signal, the receiving communication device 102' generally presents the received audio signal through speaker 112'. As the output of the speaker reverberates around the environment of the receiving user 106', an acoustic echo e' may be generated. In addition, the user 106' may speak an utterance, producing sound v'. Also, the environment of the user 106' may have background noise n'. Each of the sounds e', v', and n' may be detected by the microphone 110'.

For example, when user 106' speaks an utterance, the user's voice v' is detected by the microphone 110'. In addition, background noise n' present in the user's environment is detected by the microphone 110'. In addition, speaker 112' produces sound, creating an acoustic echo e' that is detected by the microphone 110'. Thus, an audio input signal detected by the microphone 110' includes components attributable to the user's voice v', the background noise n', and the acoustic echo e'. After processing the audio input signal, the communication device 102' generally sends an output signal through the communication link 104 to communication device 102.

To the user 106' at the receiving communication device 102', the noise n and acoustic echo e at the sending communication device 102 can interfere with spoken input v and make it difficult to understand. The communication device 102 may include an acoustic echo canceller that attempts to remove acoustic echo from audio input. In addition, communication device 102 may also include a residual echo suppressor to further reduce the level of echo that remains after processing by an acoustic echo canceller. In addition to echo, however, the processing by a residual echo suppressor often eliminates noise, as well. This processing by the residual echo suppressor can have the undesirable effect of creating abrupt changes to silence in the audio output signal sent from the communication device 102 to the communication device 102', which can cause the user 106' to mistakenly believe that the communication link 104 is dead.

Figure 2:
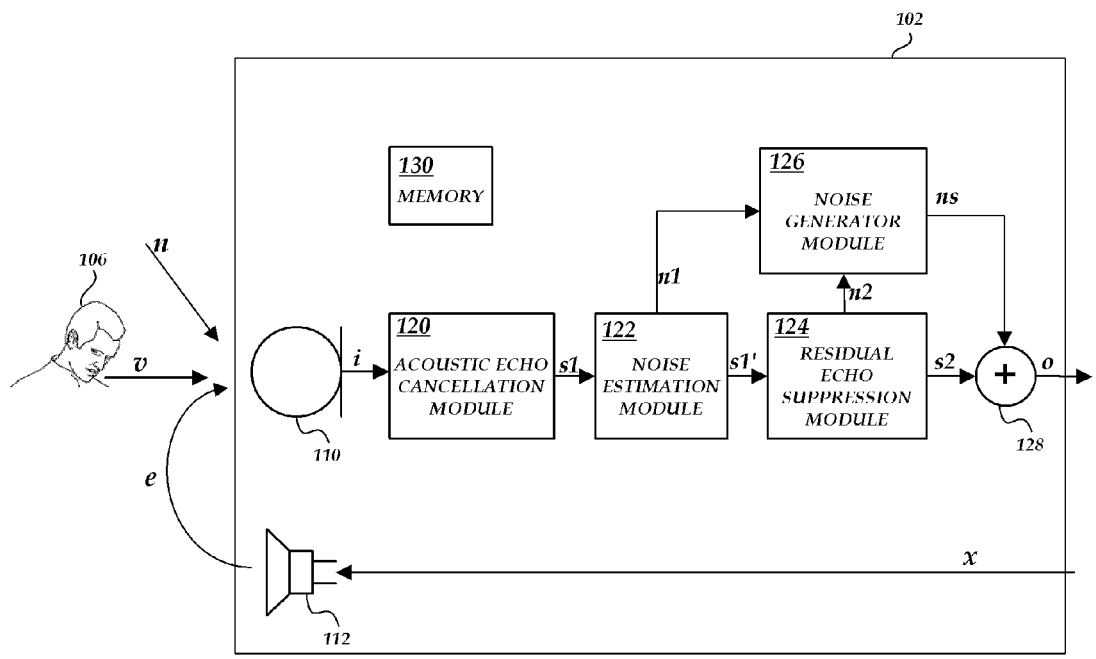
FIG. 2 is a block diagram of illustrative data flows and operations of a communication device comprising a noise generator module according to an embodiment.

FIG. 2 illustrates a communication device 102 according to an embodiment that comprises an acoustic echo cancellation module 120, a noise estimation module 122, a residual echo suppression module 124, a noise generator module 126, and a summation module 128. The communication system 102 can correspond to a wide variety of electronic devices or some combination thereof. In some embodiments, the communication system 102 may be a computing device that includes one or more processors and a memory 130 which may contain software applications executed by the processors. For example, each of the acoustic echo cancellation module 120, noise estimation module 122, residual echo suppression module 124, noise generator module 126, and summation module 128 may be implemented by one or more processors running software applications executed by the processors.

The communication system 102 may include a microphone 110 or other audio input component for accepting speech input. The audio input signal i detected by the microphone 110 includes components attributable to user's 106 voice v, the background noise n, and the acoustic echo e. For example, the acoustic echo e may be generated when the speaker 112 reproduces audio signal x, which may be received from another communication device.

The communication system 102 may include an acoustic echo cancellation module 120 to cancel acoustic echoes in the audio signal obtained from the microphone 110. For example, the acoustic echo cancellation module 120 receives the audio input signal i. The acoustic echo cancellation module 120 performs acoustic echo cancellation on the audio input signal i to generate a first signal s1, which may comprise a reduced echo compared to audio input signal i.

The communication device 102 may include a noise estimation module 122 to estimate a first noise level n1 (sometimes referred to as a noise floor estimate) present in the first signal s1. The noise estimation module 122 may estimate the first noise level n1 at a plurality of frequency bins. The noise estimation module 122 may pass the estimate of the first noise level n1 to the noise generator module 126. In addition, the noise estimation module 122 may pass the first signal s1 to the residual echo suppression module 124. In one embodiment, the first noise level n1 may be estimated using a slow attack, fast release during a silent period component or technique. However, any of a variety of techniques may be used to estimate the first noise level n1.

In some embodiments, the noise estimation module 122 comprises a noise reduction module. For example, the noise reduction module may receive the first signal s1 and perform noise reduction on the first signal s1. The noise reduction module may pass a noise-reduced version of the first signal s1' to the residual echo suppression module 124. In such embodiments, although the noise reduction module reduces the level of noise present in the first signal s1, the noise-reduced version of the first signal s1' generally still contains an appreciable level of noise. For example, if the noise-reduced version of the first signal s1' was played by a speaker, a listener generally would be able to perceive an amount of noise. If the noise estimation module 122 does not include a noise reduction module, the output s1' of the noise estimation module 122 may be the same as its input s1.

In addition, communication device 102 may include a residual echo suppression module 124 to further reduce the level of echo that remains after processing by an acoustic echo canceller. For example, the residual echo suppression module 124 receives the first signal s1' from the noise estimation module 122. The residual echo suppression module 124 may process the first signal s1' by performing residual echo suppression on the first signal s1' to determine a second signal s2. The second signal s2 may be output to a summation module 128. In addition to further reducing echo, the residual echo suppression module 124 often eliminates noise as well. For example, the residual echo suppression module 124 sometimes eliminates the level of noise that is present in the first signal s1'. As a result, without added noise from the noise generator module 126, a remote listener 106' may mistakenly believe that the communication link is dead.

To address this problem, the communication device 102 includes a noise generator module 126 to generate a noise signal ns. In various embodiments, the noise generator module 126 may perform the processes described with respect to FIGS. 3-5. The noise generator module 126 may be configured to generate the noise signal ns only to assure that some threshold level of background noise remains audible to a remote listener 106'. For example, noise generator module 126 may be configured to receive an estimate of the second noise level n2 of the second signal s2. In some embodiments, the residual echo suppressor 124 may determine the second noise level n2 and pass the second noise level n2 to the noise generator module 126. In other embodiments, the residual echo suppressor 124 may send the second signal s2 back to the noise estimation module 122, which may determine the second noise level n2 and pass the second noise level n2 to the noise generator module 126.

In some embodiments, the noise generator module 126 may be configured to determine whether the second noise level n2 is less than a product of the first noise level n1 and a noise threshold. For example, by determining whether the second noise level is less than a product of the first noise level and a noise threshold, the noise generator module 126 may determine whether the second noise level would be audible to a remote listener. In some embodiments, the noise threshold is adjustable by a listener, allowing listeners with different hearing sensitivities to adjust a noise floor below which the noise generator module 126 generates a comfort noise signal. In some embodiments, the noise threshold can have a default value of 0.5.

If the noise generator module 126 determines that the second noise level n2 is less than the product of the first noise level n1 and the noise threshold, the noise generator module 126 may generate a comfort noise signal. For example, the noise generator module 126 may determine a noise signal ns based on the first noise level. The noise generator module 126 may be configured to determine the noise signal ns so that a noise level of the noise signal is above a hearing threshold. For example, memory 130 may store a hearing threshold curve, such as described in further detail below with respect to FIG. 6. As shown, the hearing threshold varies with frequency. In determining that the noise level of the noise signal ns is above the hearing threshold, the noise generation module 126 may apply a different gain at each frequency bin so that the noise level of the noise signal ns is just above the hearing threshold at each frequency bin. Once the noise generator module 126 has determined the noise signal ns, the noise generator module 126 may send the noise signal ns to the summation module 128.

The communication device 102 may include a summation module 128 that combines the output of the residual echo suppression module 124 and the noise generator module 126. For example, the summation module 128 can combine the second signal s2 with the noise signal ns to generate an output signal o. In some embodiments, the summation module 128 simply sums the second signal s2 and the noise signal ns to generate the output signal o. In other embodiments, the summation module 128 may determine the output signal o based on some other function of the second signal s2 and the noise signal ns. The output signal o may be sent directly through a communication link 104 to another communication device. Alternatively, the output signal o may be provided to a speech recognition module. In addition, the output signal o may be provided to a gain control module (e.g., if a destination for the output signal o was a wireless device, (such as a Bluetooth device, etc.) it may be desirable to increase the gain of the output signal o before sending to the wireless device).

In some embodiments, the communication device may be configured to be used in VoIP communications. In such systems, a voice signal is sent as packets, and packet loss can be an issue. Packet loss concealment (PLC) techniques exist to conceal the effects of lost packets of voice signal. However, the processed voice in the lost voice frames can sound unnatural and discontinuous. In some embodiments, inserting a certain amount of comfort noise signal ns can be used effectively to conceal the unnatural and discontinuous sounds that result from traditional PLC techniques.

Additional hardware and/or software modules or components may be included in the communication system 102. For example, the communication device 102 may include an automatic speech recognition ("ASR") module (not shown) for performing speech recognition on an audio signal that corresponds to a local user utterance. The communication device 102 may also include a network communication module (not shown) for establishing communications over communication networks, such as communication link 104, or directly with other computing devices.

Illustratively, the communication system 102 may be (or be part of) a personal computing device, laptop computing device, hand held computing device, terminal computing device, server computing device, mobile device (e.g., mobile phones or tablet computing devices), wearable device configured with network access and program execution capabilities (e.g., "smart eyewear" or "smart watches"), wireless device, electronic reader, media player, home entertainment system, gaming console, set-top box, television configured with network access and program execution capabilities (e.g., "smart TVs"), telephone, or some other electronic device or appliance.

Process for Generating Comfort Noise

Figure 3:
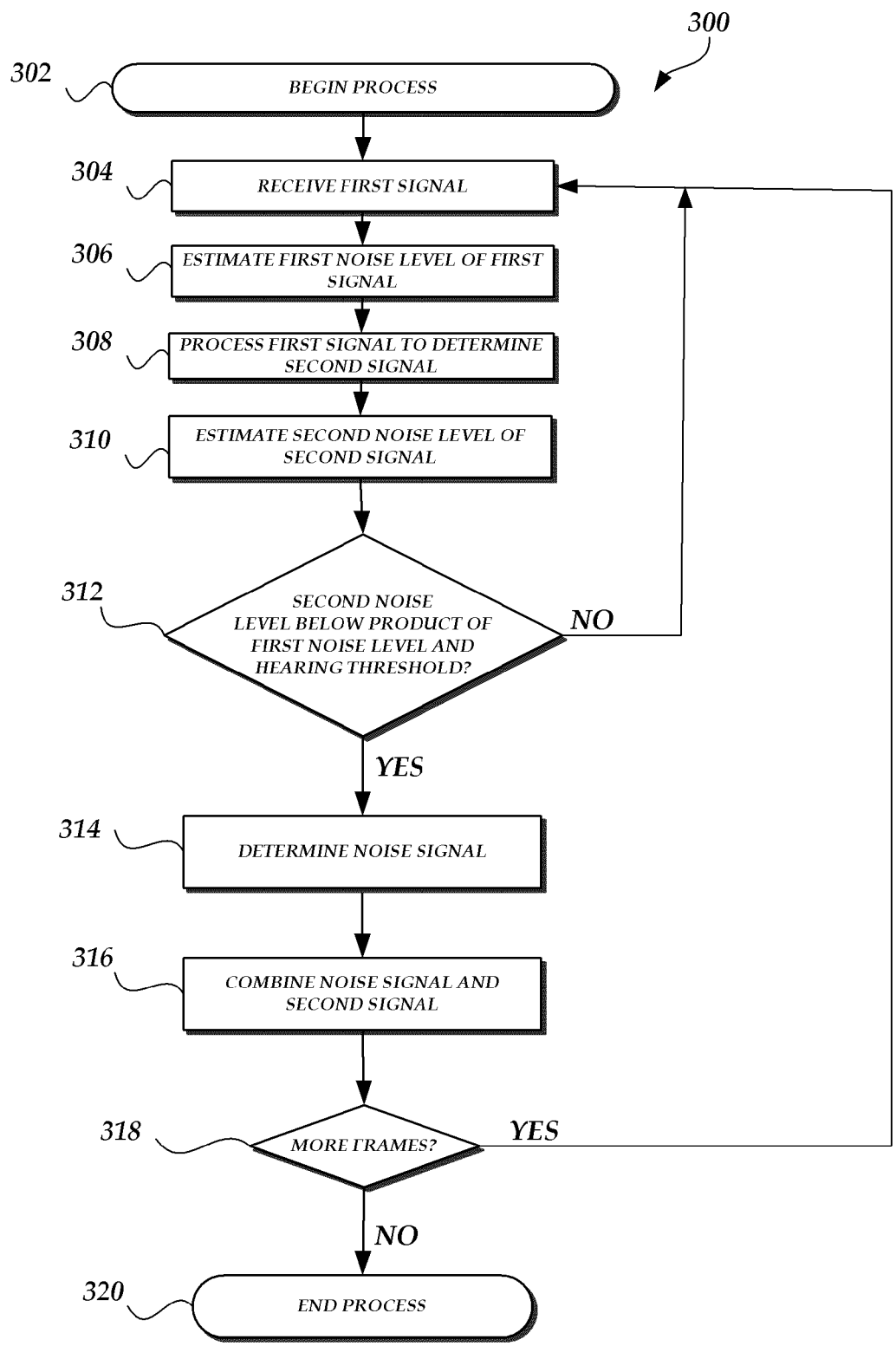
FIG. 3 is a flow diagram of an illustrative process for performing noise generation according to an embodiment.

With reference now to FIG. 3, an example process 300 for performing comfort noise generation according to an embodiment will be described. The process 300 begins at block 302. The process 300 may be embodied in hardware, a set of executable program instructions, or a combination of hardware and executable program instructions. The process 300 may be performed, for example, by the noise estimation module 122 and noise generator module 126 of the communication device 102 of FIG. 2. Although the process 300 of FIG. 3 will be described with respect to the components of FIG. 2, the process 300 is not limited to implementation by, or in conjunction with, any specific component shown in FIG. 2. In some embodiments, the process 300, or some variant thereof, may be implemented by alternative components, by the components of FIG. 2 in a different configuration, etc.

At block 304, a first signal s1 may be received. For example, the noise estimation module 122 may receive a first signal s1 based on an audio input signal i. In some embodiments, the noise estimation module 122 may receive a first signal s1 output from acoustic echo cancellation module 120.

At block 306, a first noise level n1 of the first signal s1 may be estimated. For example, the noise estimation module 122 may estimate a first noise level n1 of the first signal s1. In some embodiments, the noise estimation module 122 estimates the first noise level n1 of the first signal s1 at a plurality of frequencies. For example, the noise estimation module 122 may determine a spectral shape of the first noise level n1.

At block 308, the first signal s1 may be processed to determine the second signal s2. For example, the residual echo suppressor 124 may process the first signal s1 to determine a second signal s2. In particular, the residual echo suppressor 124 may perform residual echo suppression on the first signal s1 to determine the second signal s2.

At block 310, a second noise level n2 of the second signal s2 may be estimated. For example, the noise estimation module 122 may estimate the second noise level n2 of the second signal s2. In other embodiments, the residual echo suppressor 124 may estimate the second noise level n2 of the second signal s2. In addition, the noise estimation module 122 may estimate the second noise level n2 at a plurality of frequencies. For example, the noise estimation module 122 may determine a spectral shape of the second noise level n2.

At block 312, it may be determined whether the second noise level n2 is less than a threshold, such as (but not limited to) a product of the first noise level n1 and a noise threshold. For example, the noise generator module 126 may determine whether the second noise level n2 is less than a product of the first noise level n1 and the noise threshold. By determining whether the second noise level n2 is less than a product of the first noise level n1 and a noise threshold, the noise generator module 126 may determine whether the second noise level would be audible to a listener. In some embodiments, the noise threshold is adjustable by a listener, allowing listeners with different hearing sensitivities to adjust a noise floor below which the noise generator module 126 generates noise signal ns. In some embodiments, the noise threshold can have a default value of 0.5. In other embodiments, the noise threshold can have a default value of more or less than 0.5. For example, if a listener's age is known, a noise threshold targeted to an expected sensitivity for a listener of that age may be selected. If the noise generator module 126 determines that the second noise level n2 is not less than the product of the first noise level n1 and the noise threshold, injection of a noise signal ns may not be necessary for noise to be audible to a listener, and the process 300 may proceed back to block 304. For example, the process 300 may proceed back to block 304 to process a next frame of the received first signal s1.

If the noise generator module 126 determines that the second noise level n2 is less than the product of the first noise level n1 and the noise threshold, injection of a noise signal ns may be necessary for noise to be audible to a listener, and the process 300 may proceed to block 314. At block 314, the noise signal ns is determined. For example, the noise generator module 126 may determine the noise signal ns based on the first noise level n1. In particular, the noise generator module 126 may configure the noise signal ns to match the same spectral characteristics of the first noise level n1. In addition, a noise level of the noise signal ns may be configured to be above a hearing threshold. For example, a hearing threshold curve, which varies with frequency, may be received from memory 130. In determining that the noise level of the noise signal ns is above the hearing threshold, the noise generation module 126 may apply a different gain at each frequency bin so that the noise level of the noise signal ns is just above the hearing threshold at each frequency bin.

At block 316, the noise signal ns and second signal s2 may be combined. For example, the noise generator module 126 may combine the noise signal ns with the second signal s2 to determine an output signal o.

At block 318, it is determined whether there are more audio frames to be processed. For example, the noise estimation module 122 may determine whether there are more audio frames to be processed. If so, the process 300 may repeat, beginning at block 304. In some embodiments, blocks 304, 306, 308, 310, 312, 314, and 316 may be executed in a continuous or substantially continuous loop until there are no more frames to be processed. After there are no more frames to be processed, the process 300 ends at block 320.

Figure 4:
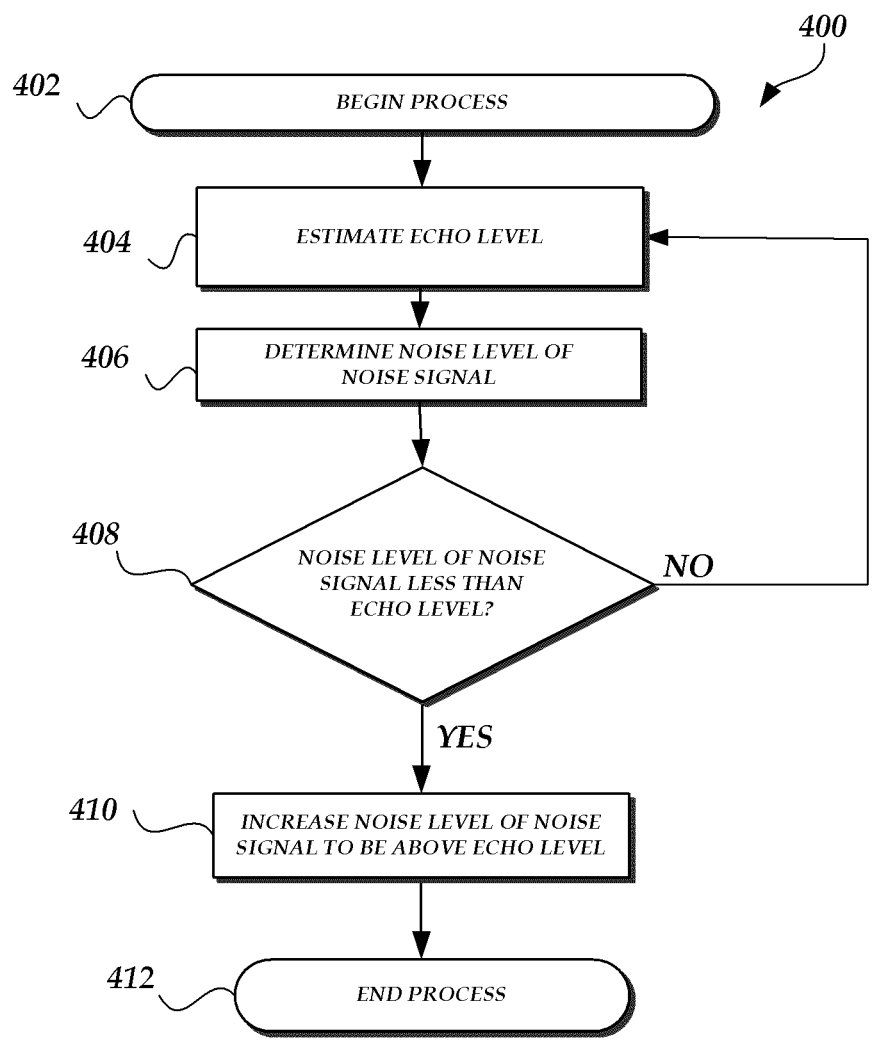
FIG. 4 is a flow diagram of another illustrative process for performing noise generation according to another embodiment.

Turning now to FIG. 4, another example process 400 for performing comfort noise generation according to an embodiment will be described. The process 400 begins at block 402. The process 400 may be embodied in hardware, a set of executable program instructions, or a combination of hardware and executable program instructions. The process 400 may be performed, for example, by the noise estimation module 122 and noise generator module 126 of the communication device 102 of FIG. 2. Although the process 400 of FIG. 4 will be described with respect to the components of FIG. 2, the process 400 is not limited to implementation by, or in conjunction with, any specific component shown in FIG. 2. In some embodiments, the process 400, or some variant thereof, may be implemented by alternative components, by the components of FIG. 2 in a different configuration, etc.

At block 404, an estimate of an echo level is received. For example, noise generator module 126 or residual echo suppression module 124 may determine an estimate of an echo level of the second signal s2 (e.g., a residual echo). Noise generator module 126 may receive the estimate of the echo level of the second signal s2 from the residual echo suppression module 124.

At block 406, a noise level of the noise signal ns may be determined. For example, as a result of determining the noise signal ns, the noise generator module 126 is aware of the noise level of the noise signal ns.

At block 408, it may be determined whether the noise level of the noise signal ns is less than the estimate of the echo level. For example, the noise generator module 126 may determine whether the noise level of the noise signal ns is less than the estimate of the echo level. If the noise generator module 126 determines that the noise level of the noise signal ns is not less than the estimate of the echo level, the noise generator module 126 may determine that noise level of the noise signal ns is sufficient to mask any residual echo present in the second signal s2. In that case, it is not necessary to increase the noise level of the noise signal ns, and the process 400 may proceed back to block 404.

If the noise generator module 126 determines that the noise level of the noise signal ns is not less than the estimate of the echo level, increase of the noise level of the noise signal ns may be desirable for the noise to mask a residual echo, and the process 400 may proceed to block 410. At block 410, the noise level of noise signal ns may be increased. For example, the noise generator module 126 may increase the noise level of the noise signal ns to be above the echo level. At block 412, the process 400 may end.

Figure 5:
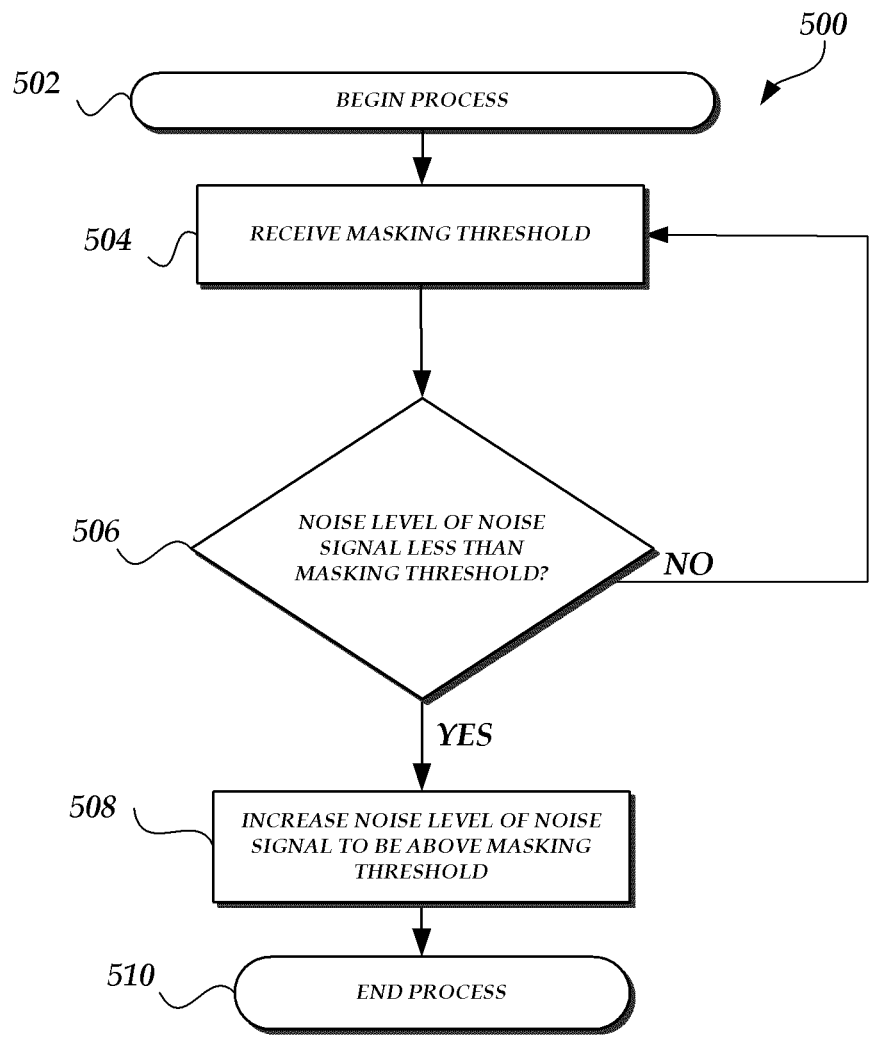
FIG. 5 is a flow diagram of another illustrative process for performing noise generation according to another embodiment.

Turning now to FIG. 5, another example process 500 for performing comfort noise generation according to an embodiment will be described. The process 500 begins at block 502. The process 500 may be embodied in hardware, a set of executable program instructions, or a combination of hardware and executable program instructions. The process 500 may be performed, for example, by the noise generator module 126 of the communication device 102 of FIG. 2. Although the process 500 of FIG. 5 will be described with respect to the components of FIG. 2, the process 500 is not limited to implementation by, or in conjunction with, any specific component shown in FIG. 2. In some embodiments, the process 500, or some variant thereof, may be implemented by alternative components, by the components of FIG. 2 in a different configuration, etc.

At block 504, a masking threshold is received. The masking threshold may comprise a value configured so that a tone is audible at a first frequency even when a tone is present at a second frequency close to the first frequency. The masking threshold may take into account that the threshold to individually hear two closely spaced tones is greater than the threshold if either tone is present individually. Generally, the masking threshold is frequency dependent, as described below in relation to FIG. 6.

At block 506, it is determined whether the noise level of the noise signal ns is less than the masking threshold. For example, the noise generator module 126 may be configured to determine whether the noise level of the noise signal ns is less than the masking threshold. If the noise generator module 126 determines that the noise level of the noise signal ns is not less than the masking threshold, the noise generator module 126 may determine that noise level of the noise signal ns is sufficient to mask any nearby tones. In that case, it is not necessary to increase the noise level of the noise signal ns, and the process 500 may proceed back to block 504.

If the noise generator module 126 determines that the noise level of the noise signal ns is not less than the masking threshold, increase of the noise level of the noise signal ns may be desirable, and the process 500 may proceed to block 508. At block 508, the noise level of noise signal ns may be increased. For example, the noise generator module 126 may increase the noise level of the noise signal ns to be above the masking threshold. In particular, the noise generator module 126 may increase the noise level of the noise signal ns to be above the masking threshold at each of a plurality of frequencies. At block 510, the process 500 may end.

Hearing Threshold and Masking Threshold Example

Figure 6:
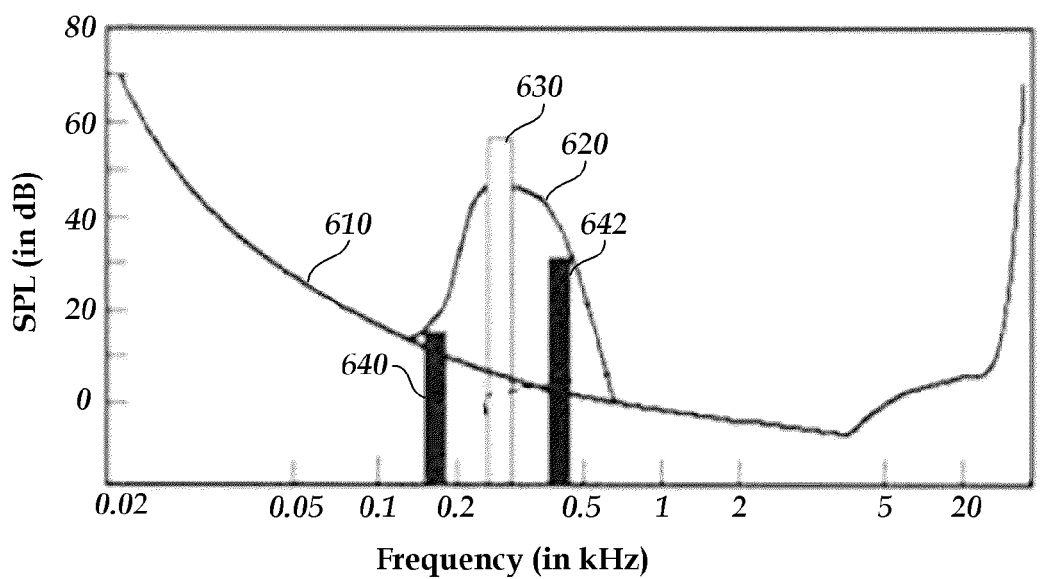
FIG. 6 is a diagram illustrating an example of a hearing threshold and a masking threshold according to an embodiment.

FIG. 6 is a diagram illustrating an example of a hearing threshold and a masking threshold according to an embodiment. For example, FIG. 6 illustrates a hearing threshold 610, measured by sound pressure level (SPL) in dB, as a function of frequency, measured in kHz. As shown, the hearing threshold 610 has relatively high values at relatively low frequencies. For example, the hearing threshold 610 at frequencies below 50 Hz is above 20 dB, meaning that sound levels below 20 dB would generally not be audible to a listener. The hearing threshold 610 has the lowest values between approximately 1 kHz and 4 kHz, signifying the frequencies at which the human ear is most sensitive. For example, the hearing threshold 610 at 3 kHz is near or under 0 dB, over 100 times more sensitive than frequencies below 50 Hz.

In some embodiments, the noise estimation module 122 is configured to estimate a noise level n1 at a plurality of frequency bins. In addition, the hearing threshold may comprise a value for each of the plurality of frequency bins. For example, the value of the hearing threshold at each of the plurality of frequency bins may be based on the values of the hearing threshold 610 shown in FIG. 6. In some embodiments, a different hearing threshold curve may be selected to determine the value of the hearing threshold at each of the plurality of frequency bins. For example, a targeted hearing threshold curve may be determined for a particular listener as a result of a hearing test. Alternatively, a different hearing threshold curve may be estimated for different listeners based on known facts pertaining to the listener, such as the listener's age.

The noise generator module 126 may be configured to determine a level of the noise signal at each of the plurality of frequency bins. For example, the noise generator module may be configured to determine the level of the noise signal at each of the plurality of frequency bins such that the level of the noise signal at each of the plurality of frequency bins is above the value of the hearing threshold at each frequency bin. In some embodiments, the noise generator module 126 may exclude certain frequencies from this determination. For example, it may not be necessary to determine the noise signal for low frequencies (e.g., frequencies below 50 Hz), particularly in view of the high sound pressure level required for such frequencies to be audible.

FIG. 6 also illustrates a masking threshold 620, measured by sound pressure level (SPL) in dB, as a function of frequency, measured in kHz. As shown, the louder frequency is called the masker 630, its nearby sounds 640 and 642 are masked tones. In the presence of masker 630, the masked sounds 640 and 642 are not audible although the masked sounds 640 and 642 are above the hearing threshold 610, because the SPLs of the masked sounds 640 and 642 are under the masking threshold 620. Auditory masking occurs when the perception of one sound 640 or 642 is affected by the presence of another sound 630.

In some embodiments, the noise generator module 126 is configured to receive a masking threshold. The masking threshold may comprise a value for each of the plurality of frequency bins. For example, the value of the masking threshold at each of the plurality of frequency bins may be based on the values of the masking threshold 620. In some embodiments, a different masking threshold curve may be selected to determine the value of the masking threshold at each of the plurality of frequency bins. For example, a targeted masking threshold curve may be determined for a particular listener as a result of a hearing test. Alternatively, a different masking threshold curve may be estimated for different listeners based on known facts pertaining to the listener, such as the listener's age.

The noise generator module 126 may be configured to determine whether the noise level of the noise signal ns (e.g., masker 630) is less than the masking threshold 620 related to the masked tones 640 and 642 (e.g., residual echo), or to determine whether the noise level of the noise signal ns (e.g., masker 630) can generate the masking threshold 620 so that the masked sound 640 or 642 (e.g., the residual echo, the closely-spaced frequency) is under the masking threshold 620. In particular, the noise generator module 126 may be configured to determine whether the noise levels of the noise signal ns (e.g., masker) can result in the masking threshold that a closely-spaced frequency (e.g., residual echo) is stronger than. If so, the noise generator module 126 may increase the noise level of the noise signal ns so that the residual echo is under the masking threshold. For example, to increase the noise level of the noise signal ns so that the residual echo is under the masking threshold 620, the noise generator module 126 may apply a gain based on a masker, such as masker 630. As a result, the noise generator module 126 may generate the masker (e.g., comfort noise) to mask the masked tones, such as masked tones 640 and 642 (e.g., the residual echo), and make the masked tones 640 and 642 inaudible.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines and algorithm steps described in connection with the embodiments disclosed herein can be implemented as electronic hardware, computer software, or combinations of both. To clearly illustrate this interchangeability of hardware and software, various illustrative components, blocks, modules and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The steps of a method, process, routine, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y and Z," unless specifically stated otherwise, is to be understood with the context as used in general to convey that an item, term, etc. may be either X, Y or Z, or a combination thereof. Thus, such conjunctive language is not generally intended to imply that certain embodiments require at least one of X, at least one of Y and at least one of Z to each be present.

While the above detailed description has shown, described and pointed out novel features as applied to various embodiments, it can be understood that various omissions, substitutions and changes in the form and details of the devices or algorithms illustrated can be made without departing from the spirit of the disclosure. As can be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A device comprising:
    a microphone configured to detect sound as an audio input signal;
    one or more processors in communication with the microphone, the one or more processors configured to:
        receive a first signal based on the audio input signal;
        estimate a first noise level of the first signal;
        perform echo cancellation on the first signal to determine a second signal;
        estimate a second noise level of the second signal;
        determine to generate a noise signal based on a comparison of the second noise level, the first noise level, and a noise threshold;
        generate the noise signal based on the first noise level, wherein a noise level of the noise signal is configured to be above a hearing threshold; and
        combine the noise signal with the second signal to generate an output signal.

2. The device of claim 1, wherein:
    the received first signal comprises a signal output from an acoustic echo canceller; and
    echo cancellation comprises residual echo suppression.

3. The device of claim 1, wherein the one or more processors are further configured to:
    estimate an echo level of the second signal;
    determine that the noise level of the noise signal is less than the echo level; and
    increase the noise level of the noise signal to be above the echo level.

4. The device of claim 1, wherein the noise threshold is adjustable by a user.

5. The device of claim 1,
    wherein the first noise level comprises a noise level at a plurality of frequency bins;
    wherein the hearing threshold comprises a value for each of the plurality of frequency bins;
    wherein the one or more processors are configured to determine the noise signal by determining a level of the noise signal at each of the plurality of frequency bins; and
    wherein the level of the noise signal at each of the plurality of frequency bins is above the value of the hearing threshold at each frequency bin.

6. The device of claim 1, wherein the one or more processors are further configured to:
    receive a masking threshold, the masking threshold comprising a value configured to be audible at a first frequency when a tone is present at a second frequency close to the first frequency;
    determine that the noise level of the noise signal is less than the masking threshold; and
    increase the noise level of the noise signal to be above the masking threshold.

7. A method comprising:
    receiving a first signal based on an audio input signal;
    estimating a first noise level of the first signal;
    processing the first signal to determine a second signal;
    estimating a second noise level of the second signal;
    determining that the second noise level is less than a product of the first noise level and a noise threshold;
    determining a noise signal based on the first noise level, wherein a noise level of the noise signal is configured to be above a hearing threshold; and
    combining the noise signal with the second signal to generate an output signal.

8. The method of claim 7, wherein processing the first signal comprises performing packet loss concealment to determine the second signal.

9. The method of claim 7, wherein the received first signal comprises a signal output from an acoustic echo canceller.

10. The method of claim 7, wherein processing the first signal comprises performing residual echo suppression on the first signal.

11. The method of claim 7, further comprising:
    estimating an echo level of the second signal;
    determining that the noise level of the noise signal is less than the echo level; and
    increasing the noise level of the noise signal to be above the echo level.

12. The method of claim 7, wherein the noise threshold is adjustable by a user.

13. The method of claim 7,
    wherein the first noise level comprises a noise level at a plurality of frequency bins;
    wherein the hearing threshold comprises a value for each of the plurality of frequency bins; and
    determining the noise signal comprises determining a level of the noise signal at each of the plurality of frequency bins, wherein the level of the noise signal at each of the plurality of frequency bins is above the value of the hearing threshold at each frequency bin.

14. The method of claim 7, further comprising:
    receiving a masking threshold, the masking threshold comprising a value configured to be audible at a first frequency even when a tone is present at a second frequency close to the first frequency;
    determining that the noise level of the noise signal is less than the masking threshold; and
    increasing the noise level of the noise signal to be above the masking threshold.

15. One or more non-transitory computer-readable storage media comprising computer-executable instructions to:
    receive a first signal based on an audio input signal;
    estimate a first noise level of the first signal;
    process the first signal to determine a second signal;
    estimate a second noise level of the second signal;
    determine that the second noise level is less than a product of the first noise level and a noise threshold;
    determine a noise signal based on the first noise level, wherein a noise level of the noise signal is configured to be above a hearing threshold; and combine the noise signal with the second signal to generate an output signal.

16. The one or more non-transitory computer-readable storage media of claim 15, wherein the instructions to process the first signal comprise instructions to perform packet loss concealment to determine the second signal.

17. The one or more non-transitory computer-readable storage media of claim 15, wherein the received first signal comprises a signal output from an acoustic echo canceller.

18. The one or more non-transitory computer-readable storage media of claim 15, wherein said computer-executable instructions are configured to process the first signal to determine the second signal by performing residual echo suppression on the first signal.

19. The one or more non-transitory computer-readable storage media of claim 15, further comprising computer-executable instructions to:
   estimate an echo level of the second signal;
   determine that the noise level of the noise signal is less than the echo level; and
   increase the noise level of the noise signal to be above the echo level.

20. The one or more non-transitory computer-readable storage media of claim 15, wherein the noise threshold is adjustable by a user.

21. The one or more non-transitory computer-readable storage media of claim 15,
   wherein the first noise level comprises a noise level at a plurality of frequency bins;
   wherein the hearing threshold comprises a value for each of the plurality of frequency bins;
   wherein said computer-executable instructions are configured to determine the noise signal by determining a level of the noise signal at each of the plurality of frequency bins; and
   wherein the level of the noise signal at each of the plurality of frequency bins is above the value of the hearing threshold at each frequency bin.

22. The one or more non-transitory computer-readable storage media of claim 15, further comprising computer-executable instructions to:
   receive a masking threshold, the masking threshold comprising a value configured to be audible at a first frequency even when a tone is present at a second frequency close to the first frequency;
   determine that the noise level of the noise signal is less than the masking threshold; and
   increase the noise level of the noise signal to be above the masking threshold.

\* \* \* \* \*